United States Patent
Yamazaki et al.

(10) Patent No.: US 11,499,055 B2
(45) Date of Patent: Nov. 15, 2022

(54) COATING SOLUTION FOR FORMING INSULATING FILM FOR GRAIN-ORIENTED ELECTRICAL STEEL SHEET, AND METHOD FOR PRODUCING GRAIN-ORIENTED ELECTRICAL STEEL SHEET

(71) Applicant: NIPPON STEEL CORPORATION, Tokyo (JP)

(72) Inventors: Shuichi Yamazaki, Tokyo (JP); Hiroyasu Fujii, Tokyo (JP); Kazutoshi Takeda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 116 days.

(21) Appl. No.: 16/760,254

(22) PCT Filed: Nov. 13, 2018

(86) PCT No.: PCT/JP2018/041965
§ 371 (c)(1),
(2) Date: Apr. 29, 2020

(87) PCT Pub. No.: WO2019/093521
PCT Pub. Date: May 16, 2019

(65) Prior Publication Data
US 2020/0354582 A1 Nov. 12, 2020

(30) Foreign Application Priority Data
Nov. 13, 2017 (JP) .............................. JP2017-218506

(51) Int. Cl.
*C09D 1/02* (2006.01)
*C23C 24/00* (2006.01)
(Continued)

(52) U.S. Cl.
CPC ................. *C09D 1/02* (2013.01); *C09D 5/00* (2013.01); *C09D 7/61* (2018.01); *C09D 7/69* (2018.01);
(Continued)

(58) Field of Classification Search
CPC ... C09D 1/02; C09D 7/69; C09D 7/61; C09D 5/00; H01F 1/147; H01F 1/18;
(Continued)

(56) References Cited

U.S. PATENT DOCUMENTS 4,037,019 A    7/1977  Steger
4,498,936 A *  2/1985  Haselkorn ............ C21D 8/1288
                                                        148/245
(Continued)

FOREIGN PATENT DOCUMENTS

JP   46-26844 B   8/1971
JP   48-39338 A   6/1973
(Continued)

OTHER PUBLICATIONS

"General rules for atomic emission spectrometry", JIS K 0116, 2014, total 94 pages.
(Continued)

*Primary Examiner* — Shuangyi Abu Ali
(74) *Attorney, Agent, or Firm* — Birch, Stewart, Kolasch & Birch, LLP

(57) ABSTRACT

A coating solution for forming an insulating film for a grain-oriented electrical steel sheet which contains one or more types of hydrous silicate powders having an average particle size of 2 μm or less, and one or more types of phosphoric acids and phosphates satisfying a relation of $\Sigma n_i M_i / \Sigma P_i \leq 0.5$, and satisfies (Formula 1).

$$1.5 \leq (\Sigma n_i M_i + \Sigma n'_j M'_j)/\Sigma P_i \leq 15 \quad \text{(Formula 1)}$$

(Continued)

(P represents the number of moles of phosphorus, M represents the number of moles of metal ions derived from the phosphate, n represents the valence of the metal ions derived from the phosphate, i represents the number of types of phosphates, M' represents the number of moles of metal elements in the hydrous silicate, n' represents the valence of the metal elements in the hydrous silicate, and j represents the number of types of hydrous silicates).

8 Claims, 1 Drawing Sheet

(51) Int. Cl.
  *H01F 1/18*  (2006.01)
  *H01F 41/32*  (2006.01)
  *C09D 7/40*  (2018.01)
  *C09D 5/00*  (2006.01)
  *C09D 7/61*  (2018.01)

(52) U.S. Cl.
  CPC ............... *C23C 24/00* (2013.01); *H01F 1/18* (2013.01); *H01F 41/32* (2013.01)

(58) Field of Classification Search
  CPC ......... H01F 41/32; C23C 22/00; C23C 22/08; C23C 22/12; C23C 22/20; C23C 22/22; C23C 22/74; C23C 24/00
  See application file for complete search history.

(56) References Cited

U.S. PATENT DOCUMENTS

| | | |
|---|---|---|
| 4,504,527 A | 3/1985 | Hara et al. |
| 2012/0088096 A1 | 4/2012 | Takeda et al. |
| 2016/0305026 A1 | 10/2016 | Terashima et al. |

FOREIGN PATENT DOCUMENTS

| | | | |
|---|---|---|---|
| JP | 54-143737 A | | 11/1979 |
| JP | 60-255980 A | | 12/1985 |
| JP | 4-165082 A | | 6/1992 |
| JP | 6-65754 A | | 3/1994 |
| JP | 6-65755 A | | 3/1994 |
| JP | 2000-169972 A | | 6/2000 |
| JP | 2000-178760 A | | 6/2000 |
| JP | 2010-37602 A | | 2/2010 |
| JP | 2010-43293 A | | 2/2010 |
| JP | P2010-43293 | * | 2/2010 |
| JP | 2017-75358 A | | 4/2017 |
| WO | WO 2010/146821 A1 | | 12/2010 |
| WO | WO 2015/115036 A1 | | 8/2015 |

OTHER PUBLICATIONS

"General rules for X-ray fluorescence analysis", JIS K 0119, 2008, total 56 pages.
"Methods for viscosity measurement of liquid", JIS Z 8803, 2011, total 221 pages.
"Particle size analysis-Laser diffraction methods", JIS Z 8825 (ISO13320), 2013, total 153 pages.
"Representation of results of particle size analysis—Part 2: Calculation of average particle sizes/diameters and moments from particle size distributions", JIS Z 8819-2: 2019 (ISO 9276-2: 2014), total 120 pages.
"Test methods for electrical steel trip and sheet—Part 1: Methods of measurement of the magnetic properties of electrical steel strip and sheet by means of an Epstein frame", JIS C 2550-1 (IEC 60404-2), 2011, total 79 pages.
"Test methods for electrical steel trip and sheet—Part 5: Methods of measurement of density, resistivity and stacking factor of electrical strip and sheet", JIS C 2550-5 (IEC 60404-13), 2011, total 43 pages.
International Search Report for PCT/JP2018/041965 dated Feb. 19, 2019.
Written Opinion of the International Searching Authority for PCT/JP2018/041965 (PCT/ISA/237) dated Feb. 19, 2019.

* cited by examiner

COATING SOLUTION FOR FORMING INSULATING FILM FOR GRAIN-ORIENTED ELECTRICAL STEEL SHEET, AND METHOD FOR PRODUCING GRAIN-ORIENTED ELECTRICAL STEEL SHEET

TECHNICAL FIELD OF THE INVENTION

The present invention relates to a coating solution for forming an insulating film for a grain-oriented electrical steel sheet, and a method for producing a grain-oriented electrical steel sheet.

Priority is claimed on Japanese Patent Application No. 2017-218506, filed on Nov. 13, 2017, the content of which is incorporated herein by reference.

RELATED ART

A grain-oriented electrical steel sheet is a steel sheet having a crystal structure with an orientation (110)[001] as a main orientation and usually containing 2 mass % or more of Si. The grain-oriented electrical steel sheet is mainly used as a core material for transformers or the like, and particularly, a material with little energy loss during transformation, that is, a material with low iron loss is required.

Although not particularly limited, a typical production process of a grain-oriented electrical steel sheet is as follows. First, a slab containing 2 to 4 mass % of Si is hot rolled, and the hot rolled sheet is annealed. Next, cold rolling is performed thereon once or twice or more with intermediate annealing therebetween to obtain a final sheet thickness, and decarburization annealing is performed. After that, an annealing separating agent is applied, and final annealing is performed. Accordingly, a crystal structure with an orientation (110)[001] as a main orientation is developed, and a final annealed film is formed on a surface of the steel sheet. For example, in a case where an annealing separating agent mainly containing MgO is used, a final annealed film mainly containing $Mg_2SiO_4$ is formed on the surface of the steel sheet. Finally, a coating solution for forming an insulating film is applied and baked, and then the resulting material is shipped.

In a grain-oriented electrical steel sheet, iron loss is improved by imparting tension to a steel sheet. Accordingly, tension is imparted to the steel sheet by forming an insulating film made of a material having a smaller thermal expansion coefficient than the steel sheet at a high temperature, and iron loss can be improved.

Various coating solutions for forming an insulating film on an electrical steel sheet have been known (see, for example, Patent Documents 1 to 11).

PRIOR ART DOCUMENT

Patent Document

[Patent Document 1] Japanese Unexamined Patent Application, First Publication No. S48-039338
[Patent Document 2] Japanese Patent Publication No. S54-143737
[Patent Document 3] Japanese Unexamined Patent Application, First Publication No. 2000-169972
[Patent Document 4] Japanese Unexamined Patent Application, First Publication No. 2000-178760
[Patent Document 5] PCT International Publication No. WO2015/115036
[Patent Document 6] Japanese Unexamined Patent Application, First Publication No. H06-065754
[Patent Document 7] Japanese Unexamined Patent Application, First Publication No. H06-065755
[Patent Document 8] Japanese Unexamined Patent Application, First Publication No. 2010-043293
[Patent Document 9] Japanese Unexamined Patent Application, First Publication No. 2010-037602
[Patent Document 10] Japanese Unexamined Patent Application, First Publication No. 2017-075358
[Patent Document 11] PCT International Publication No. WO2010/146821

DISCLOSURE OF THE INVENTION

Problems to be Solved by the Invention

An insulating film obtained by baking a coating solution formed of colloidal silica, a monophosphate, and a chromic acid disclosed in Patent Document 1 is excellent in various film characteristics such as tension.

However, the coating solution for forming an insulating film contains hexavalent chromium, and it requires equipment considerations in order to improve the work environment in a step of forming the insulating film of the grain-oriented electrical steel sheet. Therefore, it is desirable to develop a coating solution for forming an insulating film of a grain-oriented electrical steel sheet, which contains no hexavalent chromium and is capable of obtaining an insulating film which is excellent in various film characteristics such as tension.

For example, Patent Documents 2 to 5 describe a coating solution for forming an insulating film of a grain-oriented electrical steel sheet mainly containing colloidal silica and a monophosphate and using other additives instead of a chromic acid. However, the film tension of an insulating film which is obtained by the coating solution for forming an insulating film containing no chromic acid and using an additive other than the chromic acid is smaller than the film tension of an insulating film which is obtained by the coating solution for forming an insulating film containing a chromic acid. In addition, the additives used in these techniques are all more expensive than the chromic acid.

A coating solution for forming an insulating film described in Patent Documents 6 and 7 is formed as a mixture of alumina sol and a boric acid. The film tension of an insulating film which is formed by baking the coating solution is significantly larger than that of an insulating film which is obtained by baking the above-described coating solution formed of colloidal silica, a monophosphate, and a chromic acid. However, the insulating film has poor corrosion resistance. Moreover, the alumina sol as a raw material is expensive.

Accordingly, a hydrous silicate (clay mineral) powder has attracted attention as a substance whose raw materials can be obtained at relatively low cost and which may provide large film tension after baking.

For example, Patent Document 8 discloses a coating solution formed of a hydrous silicate powder and a monophosphate. Patent Document 9 discloses a coating solution formed of a hydrous silicate powder, a monophosphate, and colloidal silica. Patent Document 10 discloses a coating solution formed of a lithium silicate and kaolin which is a kind of hydrous silicate. All the insulating films obtained by baking the respective coating solutions described in the patent documents obtain film tension equal to or larger than that of an insulating film obtained by baking a coating solution formed of colloidal silica, a monophosphate, and a chromic acid. Moreover, the obtained grain-oriented electrical steel sheet has an excellent iron loss property.

However, according to the inventors, any of the insulating films formed using the above coating solutions lacks denseness. As a result, it has been found that using these coating solutions may result in a poor space factor in a case where grain-oriented electrical steel sheets after formation of an insulating film are laminated and form a core, and in insufficient corrosion resistance and water resistance of the insulating film.

Patent Document 11 relating to an insulating film of a non-oriented electrical steel sheet discloses a mixed liquid containing a metal phosphate and a silicate filler having an average particle size of 2 μm or more. A method in which the phosphate and the silicate filler having an average particle size of 2 μm or more are mixed and baked at 250° C. to 450° C. is also described as a method for forming an insulating film of an electrical steel sheet. In this technique, a silicate is added as a filler in the insulating film, and it is necessary to leave the original form in the insulating film after baking. Accordingly, a silicate having a large average particle size is used. Since the baking temperature is low, it is difficult to obtain large film tension, and this is not suitable for application to a grain-oriented electrical steel sheet. Furthermore, since a silicate filler having an average particle size of 2 μm or more is used, it is difficult to obtain sufficient film characteristics.

An object of the invention is to provide a coating solution for forming an insulating film of a grain-oriented electrical steel sheet which has large film tension, obtains film characteristics including an excellent space factor and excellent corrosion resistance and water resistance, and has an excellent iron loss property without the use of a chromium compound, and a method for producing a grain-oriented electrical steel sheet.

Means for Solving the Problem

<1> A coating solution for forming an insulating film for a grain-oriented electrical steel sheet according to an aspect of the invention contains
one or more types of hydrous silicate powders having an average particle size of 2 μm or less, and
one or more types of phosphoric acids and phosphates satisfying a relation of $\Sigma n_i M_i / \Sigma P_i \leq 0.5$, and
satisfies (Formula 1).

$$1.5 \leq (\Sigma n_i M_i + \Sigma n'_j M'_j)/\Sigma P_i \leq 15 \quad \text{(Formula 1)}$$

(P represents the number of moles of phosphorus, M represents the number of moles of metal ions derived from the phosphate, n represents the valence of the metal ions derived from the phosphate, i represents the number of types of phosphates, M' represents the number of moles of metal elements in the hydrous silicate, n' represents the valence of the metal elements in the hydrous silicate, and j represents the number of types of hydrous silicates).

<2> According to another aspect of the invention, in the coating solution for forming an insulating film for a grain-oriented electrical steel sheet according to <1>, the phosphate may be any one of an Al phosphate, a Mg phosphate, a Ca phosphate, a Zn phosphate, and a Ni phosphate.

<3> According to a further aspect of the invention, in the coating solution for forming an insulating film for a grain-oriented electrical steel sheet according to <1> or <2>, the hydrous silicate powder may be one or more of a kaolin powder, a talc powder, and a pyrophyllite powder.

<4> A method for producing a grain-oriented electrical steel sheet according to an aspect of the invention has a step of applying a coating solution for forming an insulating film for a grain-oriented electrical steel sheet to a grain-oriented electrical steel sheet after final annealing, and a step of baking the coating solution, the coating solution contains one or more types of hydrous silicate powders having an average particle size of 2 μm or less and one or more types of phosphoric acids and phosphates satisfying a relation of $\Sigma n_i M_i / \Sigma P_i \leq 0.5$, and satisfies (Formula 1), and a temperature for the baking is 600° C. to 1,000° C.

$$1.5 \leq (\Sigma n_i M_i + \Sigma n'_j M'_j)/\Sigma P_i \leq 15 \quad \text{(Formula 1)}$$

(P represents the number of moles of phosphorus, M represents the number of moles of metal ions derived from the phosphate, n represents the valence of the metal ions derived from the phosphate, i represents the number of types of phosphates, M' represents the number of moles of metal elements in the hydrous silicate, n' represents the valence of the metal elements in the hydrous silicate, and j represents the number of types of hydrous silicates).

<5> According to a still further aspect of the invention, in the method for producing a grain-oriented electrical steel sheet according to <4>, the phosphate may be any one of an Al phosphate, a Mg phosphate, a Ca phosphate, a Zn phosphate, and a Ni phosphate.

<6> According to a still further aspect of the invention, in the method for producing a grain-oriented electrical steel sheet according to <4> or <5>, the hydrous silicate powder may be one or more of a kaolin powder, a talc powder, and a pyrophyllite powder.

Effects of the Invention

According to the invention, provided are a coating solution for forming an insulating film of a grain-oriented electrical steel sheet which has large film tension, obtains film characteristics including an excellent space factor and excellent corrosion resistance and water resistance, and has an excellent iron loss property without the use of a chromium compound, and a method for producing a grain-oriented electrical steel sheet.

EMBODIMENTS OF THE INVENTION

Figure 1:
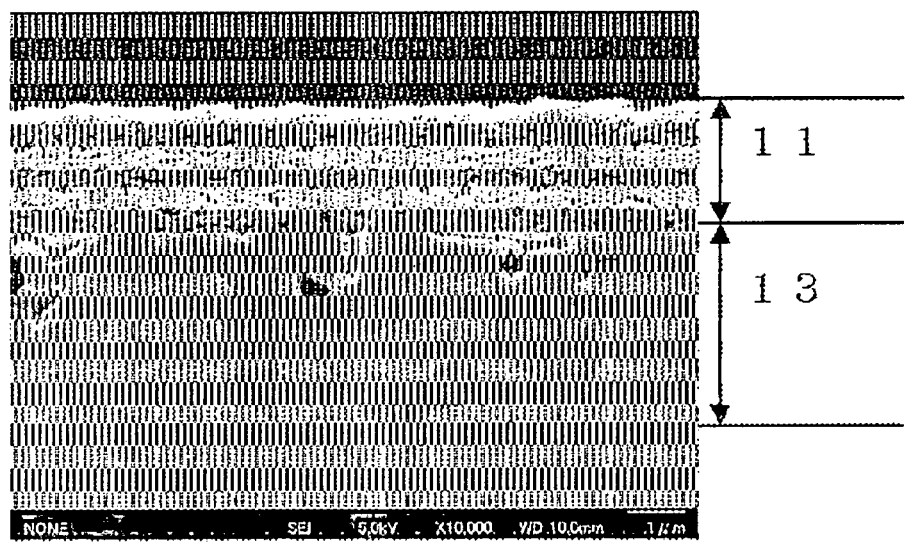
FIG. 1 is a cross-sectional photograph showing an example of a grain-oriented electrical steel sheet having a conventional an insulating film of Comparative Example 1.

Hereinafter, preferred embodiments of the invention will be described.

In this specification, a numerical value range expressed using "to" means a range including numerical values before and after "to" as a lower limit value and an upper limit value.

In this specification, the term "step" denotes not only an individual step but also a step which is not clearly distinguishable from another step as long as an effect expected from the step can be achieved.

<Coating Solution for Forming Insulating Film for Grain-Oriented Electrical Steel Sheet>

A coating solution for forming an insulating film for a grain-oriented electrical steel sheet according to this embodiment (coating solution for forming an insulating film) contains one or more types of hydrous silicate powders having an average particle size of 2 μm or less, and one or more types of phosphoric acids and phosphates satisfying the relation of $\Sigma n_i M_i / \Sigma P_i \leq 0.5$.

In a case where P represents the number of moles of phosphorus, M represents the number of moles of metal ions derived from a phosphate, n represents the valence of the metal ions derived from the phosphate, i represents the number of types of phosphates, M' represents the number of moles of metal elements in a hydrous silicate, n' represents the valence of the metal elements in the hydrous silicate, and j represents the number of types of hydrous silicates, the coating solution satisfies (Formula 1).

$$1.5 \leq (\Sigma n_i M_i + \Sigma n'_j M'_j)/\Sigma P_i \leq 15 \quad \text{(Formula 1)}$$

In a case where only a phosphoric acid is selected, $\Sigma n_i M_i$ represents 0.

For example, an insulating film obtained by adding a monophosphate (for example, aluminum monophosphate ($Al_2O_3 \cdot 3P_2O_5 \cdot 6H_2O$)) with a hydrous silicate powder contained mainly and by performing heating at 600° C. or higher can obtain film tension equal to or larger than that of an insulating film obtained by baking a coating solution containing colloidal silica, a monophosphate, and a chromic acid. However, according to the inventors, it has been found that a grain-oriented electrical steel sheet produced in the above manner may have a poor space factor and may also have poor corrosion resistance and water resistance.

Accordingly, the inventors produced the following grain-oriented electrical steel sheet and conducted studies on the influence of the insulating film of the grain-oriented electrical steel sheet on the space factor, corrosion resistance, and water resistance.

A coating solution obtained by adding 100 g of kaolin to 52.8 g of an aluminum monophosphate aqueous solution having a concentration of 50% was applied to a grain-oriented electrical steel sheet subjected to final annealing and having a sheet thickness of 0.23 mm, and was dried such that a film amount after baking was 5 g/m². The coating solution was baked for 30 seconds at 850° C.

FIG. 1 is a cross-sectional scanning electron microscope (SEM) photograph of a film structure of a grain-oriented electrical steel sheet obtained in the above manner. In FIG. 1, the reference numeral 11 represents an insulating film, and the reference numeral 13 represents a final-annealed film (hereinafter, the reference numerals will be omitted). From this SEM photograph, it is found that there are many voids in the insulating film. Due to the presence of the voids, the density of the insulating film is reduced, and the film thickness is increased with respect to the same amount of film (g/m²). As a result, the space factor is thought to be poor. In addition, in a case where there are a large number of voids, the voids may be connected and form through-holes in the insulating film. The through-holes are thought to transmit moisture and humidity, deteriorate corrosion resistance of the electrical steel sheet, and deteriorate water resistance.

By observing the cross-sectional SEM photograph of FIG. 1, it was possible to presume the following facts. In a case where a mixture of a hydrous silicate and a monophosphate is heated to 600° C. or higher, the hydrous silicate and the monophosphate are dehydrated and become anhydrous silicate and anhydrous phosphate, respectively. The anhydrous silicate substantially maintains its original shape, and the anhydrous phosphate is incompletely bonded between the anhydrous silicate grains. That is, incomplete fusion between the silicate and the phosphate causes voids to be formed, and leads to deterioration of the space factor, corrosion resistance, and water resistance.

In order to eliminate the voids in the insulating film observed in FIG. 1, adding an excessive amount of a monophosphate to the hydrous silicate is considered. However, in a case where an excess amount of a monophosphate is added, the amount of a $P_2O_5$ component which does not contribute to the film tension is increased, thereby reducing the film tension to be obtained. Accordingly, in order to eliminate or reduce the voids without reducing the film tension, it is desirable to reduce the voids while suppressing the amount of the phosphate component to be added.

Therefore, the inventors have conducted studies on promoting the reaction between the silicate and the phosphate and further increasing the fusion therebetween.

Phosphate is produced by reacting a metal oxide, metal hydroxide, or the like with a phosphoric acid. Phosphate is classified by a mixing ratio of a phosphoric acid to a metal oxide or the like. In a case where the number of moles of phosphorus in the phosphoric acid or phosphate is represented by P, the number of moles of metal ions in the phosphate is represented by M, and the valence of the metal ions in the phosphate is represented by n, the phosphoric acid and the phosphate are represented by nM/P=0, 1, 2, 3, etc. The value of nM/P is not limited to an integer value, and can be continuously set between 0 and 3. In a case of the phosphoric acid, the values of n and M were 0. Therefore, nM/P=0 represents the phosphoric acid ($H_3PO_4$). nM/P=1, nM/P=2, and nM/P=3 are called a monophosphate, a diphosphate, and a triphosphate, respectively.

Here, a specific chemical composition formula will be described by using an aluminum salt of a phosphoric acid as an example. A monophosphate, a diphosphate, and a triphosphate are represented by $Al(H_2PO_4)_3$, $Al_2(HPO_4)_3$, and $AlPO_4$, respectively. In a case of nM/P>1, the phosphate is hard to dissolve in water, and it is difficult to produce a water soluble insulating film coating solution. In a case where a phosphate satisfying nM/P<1 is used for an insulating film of an electrical steel sheet, water soluble phosphorus (P) remains in the insulating film after baking. Accordingly, the phosphate generally used for an insulating film of an electrical steel sheet has a composition of nM/P=1 represented by monophosphate.

The inventors have thought that the reactivity with a hydrous silicate may be improved in a case where a phosphate and a phosphoric acid satisfying nM/P<1, which have not been usually used for an insulating film of an electrical steel sheet, are used. In addition, the inventors have thought that the film characteristics are improved in a case where a phosphate and a phosphoric acid satisfying nM/P<1 are mixed with a hydrous silicate at an appropriate ratio.

Using a phosphoric acid satisfying nM/P=0 and a phosphate satisfying 0<nM/P≤0.5, the inventors have conducted studies on a mixing ratio of the phosphate and the phosphoric acid to a hydrous silicate, and found that the insulating film is a dense film with very few voids. As a result, it has been found that an insulating film excellent in film strength, space factor, corrosion resistance, and water resistance is obtained. Moreover, it has been found that since an excellent film strength is obtained, iron loss is reduced.

Hereinafter, constituent materials of the coating solution according to this embodiment will be described.

(Hydrous Silicate Powder)

One or more types of hydrous silicate powders are blended in the coating solution for forming an insulating film according to this embodiment.

Hydrous silicate is also called clay mineral and has a layered structure in many cases. The layered structure is a structure in which a 1:1 silicate layer represented by the composition formula $X_{2-3}$ $Si_2O_5(OH)_4$ and a 2:1 silicate layer represented by the composition formula $X_{2-3}(Si, Al)_4O_{10}(OH)_2$ are used singly or mixed, and laminated. X represents Al, Mg, Fe, or the like. At least one of water molecules or ions or combination thereof may be included between the layers of the layered structure.

Representative examples of the hydrous silicate include kaolin (or kaolinite) ($Al_2Si_2O_5(OH)_4$), talc ($Mg_3Si_4O_{10}(OH)_2$), and pyrophyllite ($Al_2Si_4O_{10}(OH)_2$). A large number of the hydrous silicate powders mainly containing a hydrous silicate is obtained through purification and pulverization of a natural hydrous silicate. As the hydrous silicate powder, one or more of a kaolin powder, a talc powder, and a pyrophyllite powder may be used in view of industrial availability. The hydrous silicates may be used in combination. The hydrous silicate powder is mainly used for a filler of a lacquer or a coating of glossy paper. In the former case, a coarse grain powder having an average particle size of 2 μm or more is used, and in the latter case, a fine grain powder having an average particle size of 2 μm or less is used.

Regarding the average particle size of the hydrous silicate powder, a hydrous silicate powder having a small average particle size may be selected in view of the fact that mutual fusion due to the reaction between the phosphoric acid and phosphate and the hydrous silicate easily occurs. Specifically, the average particle size of the hydrous silicate powder is 2 μm or less. That is, a hydrous silicate powder for use as a filler is not suitable. In a case where the average particle size is 2 μm or less, reactivity between the phosphoric acid and phosphate and the hydrous silicate is improved, and voids in the insulating film after baking are easily reduced. As a result, an excellent space factor, and excellent corrosion resistance and water resistance are obtained.

In a case where the average particle size is too large (more than 2 μm), surface unevenness of the insulating film is increased, and the space factor, the corrosion resistance, and the water resistance tend to be poor. The average particle size of the hydrous silicate powder may be less than 2.0 μm, 1.5 μm or less, 1.0 μm or less, or 0.5 μm or less. The lower limit value of the average particle size of the hydrous silicate powder is not particularly limited, and may be, for example, 0.05 μm or more. The influence of a significantly small particle size of the hydrous silicate has not been specified, and no particular adverse effects have been confirmed as shown in Examples 3 and 9 to be described later in a case of industrially available hydrous silicate of up to 0.1 μm.

The average particle size of the hydrous silicate powder is a numerical value defined by a particle size corresponding to a cumulative frequency of 50% on a volume basis in a distribution curve of the sphere equivalent diameter obtained by a laser diffraction/scattering method based on ISO 13320 and JIS Z 8825 (2013).

In this embodiment, the average particle size of the hydrous silicate can be obtained by measuring the particle size distribution by the laser diffraction/scattering method defined in ISO 13320 and JIS Z 8825 (2013) with the method for calculating an average particle size described in JIS Z 8819-2 (2001).

(Phosphoric Acid and Phosphate)

One or more types of phosphoric acids and phosphates are blended in the coating solution for forming an insulating film according to this embodiment. That is, one or more types selected from the group consisting of phosphoric acids and phosphates are blended in the coating solution for forming an insulating film.

In the coating solution for forming an insulating film according to this embodiment, the phosphoric acid and the phosphate satisfy the condition of $\Sigma n_i M_i / \Sigma P_i \leq 0.5$. In a case where the phosphoric acid and the phosphate satisfy the condition of $\Sigma n_i M_i / \Sigma P_i \leq 0.5$, reactivity between the phosphoric acid and phosphate and the hydrous silicate powder is excellent during the baking on the coating film of the coating solution. In a case of the phosphoric acid, nM is 0 and nM/P is 0 as described above. In a case of the phosphate mixed with the phosphoric acid, the condition of $0 < \Sigma n_i M_i / \Sigma P_i \leq 0.5$ is satisfied. In a case where a coating solution for forming an insulating film is prepared using a phosphate having a value of $\Sigma n_i M_i / \Sigma P_i$ exceeding 0.5, the porosity in the insulating film is increased, and the space factor and the corrosion resistance are poor. Accordingly, the condition of $\Sigma n_i M_i / \Sigma P_i \leq 0.5$ is preferably satisfied.

One or more types of phosphoric acids and phosphates represent any of the following aspects (1) to (3): (1) either a phosphoric acid or one type of phosphate, (2) two or more types of phosphates, and (3) the total number of phosphoric acid types and phosphate types is two or more.

In a case where two or more types of phosphoric acids and phosphates are used, $\Sigma n_i M_i / \Sigma P_i$ is indicated as a value obtained by dividing the sum of nM ($\Sigma n_i M_i = n_1 M_1 + n_2 M_2 + \ldots + n_i M_i$) of the phosphoric acid and the phosphate by the sum of P ($\Sigma P_i = P_1 + P_2 + \ldots + P_i$).

A phosphate satisfying the condition of $0 < \Sigma n_i M_i / \Sigma P_i \leq 0.5$ is obtained by reacting a metal oxide, a metal hydroxide, or the like with a phosphoric acid.

For example, in a case where the phosphate is a phosphate of magnesium (Mg), since the valence of magnesium is 2, a magnesium phosphate having a value of $\Sigma n_i M_i / \Sigma P_i$ of 0.4 can be obtained by mixing 1 mole of magnesium oxide (MgO) or magnesium hydroxide ($Mg(OH)_2$) with 5 moles of phosphoric acid ($H_3PO_4$).

In addition, a mixture may be produced by appropriately mixing a phosphoric acid (nM/P=0) with a monophosphate (nM/P=1). For example, in a case where the phosphate is a phosphate of aluminum (Al), an aluminum phosphate having a value of $\Sigma n_i M_i / \Sigma P_i$ of 0.5 can be obtained by mixing 1 mole of phosphoric acid with 1 mole of aluminum monophosphate.

The phosphoric acid is easily available as a phosphoric acid aqueous solution. As the phosphate, any one of an Al phosphate, a Mg phosphate, a Ca phosphate, a Zn phosphate, and a Ni phosphate may be used. Otherwise, two or more of an Al phosphate, a Mg phosphate, a Ca phosphate, a Zn phosphate, and a Ni phosphate may be used as the phosphate. These phosphates are easily available in the industry as a phosphate aqueous solution.

(Blending of Hydrous Silicate Powder with One or More Types of Phosphoric Acids and Phosphates)

In the coating solution for forming an insulating film according to this embodiment, blending of one or more types of hydrous silicate powders having an average particle size of 2 μm or less with one or more types of the phosphoric acids and the phosphates satisfies the following formula:

$$1.5 \leq (\Sigma n_i M_i + \Sigma n'_j M'_j) / \Sigma P_i \leq 15 \qquad \text{(Formula 1)}$$

Even in a case where the phosphoric acid and the phosphate satisfy the condition of $\Sigma n_i M_i / \Sigma P_i \leq 0.5$, the porosity in the insulating film is increased, and the space factor and the corrosion resistance deteriorate in a case where the amount of the phosphoric acid and phosphate blended with the hydrous silicate is small and $15<(\Sigma n_i M_i+\Sigma n'_j M'_j)/\Sigma P_i$ is satisfied. In a case where an excessive amount of the phosphoric acid and phosphate is blended with the hydrous silicate and $(\Sigma n_i M_i+\Sigma n'_j M'_j)/\Sigma P_i<1.5$ is satisfied, the amount of water soluble P (water soluble phosphorus) in the insulating film after baking is increased, and satisfactory water resistance is not obtained. In addition, film tension tends to be poor.

Here, i represents the number of types of phosphates, and j represents the number of types of hydrous silicates. For example, in a case where one type of phosphate is used, $\Sigma n_i M_i$ is a value of nM of the phosphate used singly. Similarly, in a case where two types of phosphates are used, $\Sigma n_i M_i$ is the sum of $n_1 M_1$ of the first phosphate and $n_2 M_2$ of the second phosphate $(n_1 M_1+n_2 M_2)$. For example, in a case where one type of hydrous silicate powder is used, $\Sigma n'_j M'_j$ is a value of n'M' of the hydrous silicate used singly. Similarly, in a case where two types of hydrous silicate powders are used, $\Sigma n'_j M'_j$ is the sum of $n'_1 M'_1$ of the first hydrous silicate and $n'_2 M'_2$ of the second hydrous silicate $(n'_1 M'_1+n'_2 M'_2)$.

The blending ratio of the phosphoric acid and phosphate to the hydrous silicate may be within a range of $2.0 \leq (\Sigma n_i M_i+\Sigma n'_j M'_j)/\Sigma P_i \leq 15$, or a range of $5.0 \leq (\Sigma n_i M_i+\Sigma n'_j M'_j)/\Sigma P_i \leq 15$.

The solid content concentration of the coating solution for forming an insulating film is not particularly limited as long as the coating solution can be applied to a grain-oriented electrical steel sheet. The solid content concentration of the coating solution for forming an insulating film is, for example, within a range of 5 to 50 mass %, and more preferably 10 to 30 mass %.

The viscosity of the coating solution for forming an insulating film is preferably 1 mPa·s to 100 mPa·s. The viscosity is measured by a B-type viscometer (Brookfield viscometer). The measurement temperature is 25° C.

The viscosity is measured by a single cylindrical rotational viscometer described in JIS Z 8803 (2011).

The coating solution for forming an insulating film according to this embodiment may have the following composition in view of forming a dense film and obtaining an insulating film excellent in film strength, space factor, corrosion resistance, and water resistance. The coating solution for forming an insulating film contains, as main components, one or more types of hydrous silicate powders having an average particle size of 2 µm or less and one or more types of phosphoric acids and phosphates satisfying the condition of $\Sigma n_i M_i/\Sigma P_i \leq 0.5$. Specifically, after mixing of a hydrous silicate powder having an average particle size of 2 µm or less with a phosphoric acid and a phosphate satisfying the condition of $\Sigma n_i M_i/\Sigma P_i \leq 0.5$, the total solid content of the components may be 97 mass % or more in the total solid content of the coating solution. The total solid content of the components may be 99 mass % or more, or 100 mass %. Other additives may be optionally contained in a small amount as long as an insulating film does not impair the above-described characteristics, or may not be contained (0 mass %). The coating solution for forming an insulating film may not contain hexavalent chromium in view of the work environment. An insulating film obtained by the coating solution for forming an insulating film according to this embodiment is baked at a high temperature (for example, 600° C. or higher) in order to impart large tension. Therefore, in a case where the coating solution for forming an insulating film contains a resin, the resin is decomposed and carburized by baking. As a result, magnetic characteristics of the grain-oriented electrical steel sheet are deteriorated. For this reason, the coating solution for forming an insulating film may not contain an organic component such as a resin.

In a case where other additives are contained in a small amount, the content thereof may be 3 mass % or less, or 1 mass % or less with respect to the total solid content of the coating solution for forming an insulating film according to this embodiment. Examples of other additives include a surfactant which prevents the repelling of the coating solution on a steel sheet. In addition, it is more preferable that the coating solution for forming an insulating film according to this embodiment does not contain colloidal silica in order to obtain larger tension when an insulating film is formed. In a case where the coating solution for forming an insulating film according to this embodiment contains colloidal silica, the content of the colloidal silica is preferably 45 mass % or less, and more preferably 20 mass % or less.

Here, the coating solution for forming an insulating film according to this embodiment can impart tension to a steel sheet by baking, and is suitable as a coating solution for forming an insulating film of a grain-oriented electrical steel sheet. The coating solution for forming an insulating film according to this embodiment can also be applied to a non-oriented electrical steel sheet. However, even in a case where the coating solution for forming an insulating film according to this embodiment is applied to a non-oriented electrical steel sheet, the insulating film contains no organic component, and thus there is no punchability improving effect in the steel sheet. Therefore, there are few benefits in application to a non-oriented electrical steel sheet.

(Coating Solution Preparation Method)

Preparation of the coating solution for forming an insulating film according to this embodiment may include, for example, mixing and stirring one or more types of hydrous silicate powders having an average particle size of 2 µm or less and one or more types of phosphoric acid aqueous solutions and phosphate aqueous solutions satisfying the condition of $0<\Sigma n_i M_i/\Sigma P_i \leq 0.5$. Other additives may be optionally added, and then mixed and stirred. The coating solution for forming an insulating film may be adjusted to have a target solid content concentration.

(Analysis of Components of Coating Solution)

In the coating solution for forming an insulating film according to this embodiment, the phosphoric acid and phosphate and the hydrous silicate in the coating solution can be measured as follows.

In a coating solution obtained by mixing a hydrous silicate powder and a phosphate aqueous solution (or phosphoric acid aqueous solution), both the components hardly react with each other at 100° C. or lower. Accordingly, the coating solution at 100° C. or lower is in a slurry state in which the hydrous silicate powder is dispersed in the phosphate aqueous solution (or phosphoric acid aqueous solution).

Specifically, first, the coating solution after mixing is filtered. By filtering, the coating solution is separated into a filtrate containing a phosphate aqueous solution (or phosphoric acid aqueous solution) derived from the phosphate aqueous solution (or phosphoric acid aqueous solution) before mixing, and residues containing a hydrous silicate derived from the hydrous silicate powder. Next, the filtrate is subjected to high-frequency inductively coupled plasma-atomic emission spectroscopy (ICP-AES analysis) to find the values of $\Sigma n_i M_i$ and $\Sigma P_i$. In a case where the filtrate is derived only from the phosphoric acid aqueous solution, $\Sigma n_i M_i$ is 0. The residues are subjected to fluorescent X-ray analysis to find the value of $\Sigma n'_j M'_j$. The ICP-AES analysis is performed by the method described in JIS K 0116 (2014), and the fluorescent X-ray analysis is performed by the method described in JIS K 0119 (2008).

The average particle size of the hydrous silicate powder is obtained as follows. The hydrous silicate powder separated as above is dispersed in a solvent in which the hydrous silicate powder does not dissolve. Then, the average particle size is obtained by applying the above-described laser diffraction/scattering method.

<Method for Producing Grain-Oriented Electrical Steel Sheet>

Next, a method for producing a grain-oriented electrical steel sheet according to this embodiment will be described.

A method for producing a grain-oriented electrical steel sheet according to this embodiment includes the steps of: applying a coating solution for forming an insulating film for a grain-oriented electrical steel sheet to a grain-oriented electrical steel sheet after final annealing; and baking the coating solution. The coating solution contains one or more types of hydrous silicate powders having an average particle size of 2 μm or less and one or more types of phosphoric acids and phosphates satisfying the condition of $\Sigma n_i M_i / \Sigma P_i \leq 0.5$, and satisfies (Formula 1). The baking temperature is 600° C. to 1,000° C.

$$1.5 \leq (\Sigma n_i M_i + \Sigma n'_j M'_j) / \Sigma P_i \leq 15 \quad \text{(Formula 1)}$$

P represents the number of moles of phosphorus. M represents the number of moles of metal ions derived from the phosphate. n represents the valence of the metal ions derived from the phosphate. i represents the number of types of phosphates. M' represents the number of moles of metal elements in the hydrous silicate. n' represents the valence of the metal elements in the hydrous silicate. j represents the number of types of hydrous silicates.

In a case where only a phosphoric acid is selected, $\Sigma n_i M_i$ represents 0.

(Grain-Oriented Electrical Steel Sheet After Final Annealing)

The grain-oriented electrical steel sheet after final annealing is a grain-oriented electrical steel sheet serving as a base metal before application of the coating solution (that is, the coating solution for forming an insulating film according to this embodiment). The grain-oriented electrical steel sheet after final annealing is not particularly limited. As a suitable example, the grain-oriented electrical steel sheet serving as a base metal is obtained as follows. Specifically, for example, a steel piece containing 2 mass % to 4 mass % of Si is subjected to hot rolling, hot-band annealing, and cold rolling, and then subjected to decarburization annealing. Then, an annealing separating agent in which the MgO content is 50 mass % or more is applied, and final annealing is performed. The grain-oriented electrical steel sheet after final annealing may not have a final annealed film.

(Application and Baking of Coating Solution for Forming Insulating Film)

The coating solution for forming an insulating film according to this embodiment is applied to the grain-oriented electrical steel sheet after final annealing, and then baked. The coating amount is not particularly limited, and preferably, the coating solution is applied such that the film amount after formation of the insulating film is within a range of 1 g/m² to 10 g/m² in view of obtaining an excellent film strength, an excellent space factor, and excellent corrosion resistance and water resistance, and obtaining an iron loss reducing effect. More preferably, the film amount after formation of the insulating film is 2 g/m² to 8 g/m². The coating amount after baking can be obtained from the weight difference of the steel sheet before and after peeling of the insulating film by immersion in a 20% sodium hydroxide aqueous solution at 80° C.

The method for applying the coating solution for forming an insulating film to the grain-oriented electrical steel sheet after final annealing is not particularly limited. Examples thereof include coating methods based on a roll method, a spraying method, or a dipping method.

After application of the coating solution for forming an insulating film, the coating solution is baked. In order to form a dense film and to obtain good film tension, the reaction between the hydrous silicate powder and the phosphate (or between the hydrous silicate powder and the phosphoric acid) is promoted. A large amount of hydrous silicate releases structural water near a heating temperature of 550° C., and reacts with the phosphate in that process. Accordingly, the baking temperature is 600° C. or higher. In a case where a baking temperature of higher than 1,000° C. is adopted, the grain-oriented electrical steel sheet is softened and strain is easily caused. Accordingly, the baking temperature is set to 1,000° C. or lower. In a case where the baking temperature is lower than 600° C., the hydrous silicate powder and the phosphate do not sufficiently react with each other. Accordingly, an insulating film is formed in which the hydrous silicate powder and the phosphate are mixed. The lower limit of the baking temperature is preferably 700° C. or higher, and the upper limit is preferably 950° C. or lower. The baking time may be 5 seconds to 300 seconds, and more preferably 10 seconds to 120 seconds.

The heating method for performing the baking is not particularly limited, and examples thereof include a method using a radiation furnace, a method using a hot stove, and induction heating.

The insulating film after baking is a dense film. The thickness of the insulating film may be 0.5 μm to 5 μm, and more preferably 1 μm to 4 μm.

The thickness of the insulating film after baking can be obtained by cross-sectional SEM observation.

Through the above steps, a grain-oriented electrical steel sheet which has large film tension, obtains film characteristics including an excellent space factor and excellent corrosion resistance and water resistance, and has an excellent iron loss property is obtained using the coating solution for forming an insulating film according to this embodiment.

Although the preferred embodiments of the invention have been described as above, it is obvious that the invention is not limited to the above embodiments. It is obvious that the configurations of the above-described embodiments can be combined with each other, and combinations thereof are also included within the technical scope of the invention. The above description is a merely an example, and any of those achieving similar effects with substantially the same configuration as the technical idea described in the claims of the invention is included within the technical scope of the invention.

EXAMPLES

Hereinafter, the invention will be described in detail with reference to examples, but is not limited thereto.

Example A

First, a coating solution having a composition shown in Table 1 is prepared. Next, a grain-oriented electrical steel sheet ($B_8$=1.93 T) having a sheet thickness of 0.23 mm and having a final-annealed film subjected to final annealing is prepared. Next, the coating solution having a composition shown in Table 1 is applied and dried on the prepared grain-oriented electrical steel sheet such that the amount of an insulating film after baking is 5 g/m², and baking is performed for 30 seconds at 850° C.

Film characteristics and magnetic characteristics of the obtained grain-oriented electrical steel sheet with an insulating film are evaluated. The results are shown in Table 2.

The average particle size of the hydrous silicate shown in Table 1 is a numerical value calculated by the above-described method. The amount of the phosphoric acid and the phosphate blended was adjusted so as to obtain a value of $\Sigma n_i M_i/\Sigma P_i$ shown in Table 1. For example, in Example 1, a phosphoric acid aqueous solution and an aluminum phosphate aqueous solution were mixed and adjusted such that $\Sigma n_i M_i/\Sigma P_i$ was 0.5. In Example 1, the amount blended is a total value of amounts of a phosphoric acid and an aluminum phosphate in terms of solid anhydride.

$(\Sigma n_i M_i + \Sigma n'_j M'_j)/\Sigma P_i$ shown in Table 1 is a calculated value obtained by mixing and adjustment of a hydrous silicate powder with a phosphoric acid or a phosphate so as to be a value shown in Table 1. Methods for the respective evaluation shown in Table 2 are as follows.

(Space Factor)

Measurement is performed according to the method described in JIS C 2550-5 (2011) (corresponding to: IEC 60404-13).

(Corrosion Resistance)

An aqueous solution of 5 mass % NaCl is continuously sprayed on a test piece maintained at 35° C. A state of rust after 48 hours is observed, and an area fraction is calculated.

(Water Resistance)

The amount of phosphorus (P) per unit area, eluted by immersing a test piece (50 mm×50 mm) in boiling water for 1 hour, is employed. The amount of P is a quantitative value analyzed by inductively coupled plasma-atomic emission spectroscopy (ICP-AES: high-frequency inductively coupled plasma-atomic emission spectroscopy).

(Film Tension)

Film tension is calculated from the warpage of the steel sheet occurring when one side of the insulating film is peeled off. Specific conditions are as follows.

The insulating film on only one side of the electrical steel sheet is removed by an alkali aqueous solution. Thereafter, film tension is obtained by (Formula 2) from the warpage of the electrical steel sheet.

Film Tension=190×Sheet Thickness (mm)×Warpage of Sheet (mm)/{Sheet Length (mm)}² [MPa]  (Formula 2)

(Iron Loss)

Measurement is performed according to the method described in JIS C 2550-1 (2011) (corresponding to: IEC 60404-2). Specifically, iron loss ($W_{17/50}$) per unit mass is measured under the conditions of amplitude of measured magnetic flux density of 1.7 T and a frequency of 50 Hz.

TABLE 1

| | Composition Of Coating Solution | | | | | | |
|---|---|---|---|---|---|---|---|
| | Hydrous Silicate | | | Phosphoric Acid Or Phosphate | | | |
| | Name | Average Particle Size (μm) | Amount Blended (g) | Name | $\Sigma n_i M_i/\Sigma P_i$ | Amount Blended (g) | $(\Sigma n_i M_i + \Sigma n'_j M'_j)/\Sigma P_i$ |
| Reference Example | | | Reference Coating Solution | | | | |
| Comparative Example 1 | Kaolin | 0.5 | 100.0 | Aluminum Phosphate | <u>1.0</u> | 26.4 | 10.0 |
| Comparative Example 2 | Kaolin | 0.5 | 100.0 | Aluminum Phosphate | <u>0.6</u> | 156.7 | 2.0 |
| Comparative Example 3 | Kaolin | 0.5 | 100.0 | Aluminum Phosphate | 0.4 | 11.9 | <u>18.0</u> |
| Comparative Example 4 | Kaolin | 0.5 | 100.0 | Aluminum Phosphate | 0.5 | 13.9 | <u>16.0</u> |
| Example 1 | Kaolin | 0.5 | 100.0 | Aluminum Phosphate | 0.5 | 14.8 | 15.0 |
| Example 2 | Kaolin | 0.5 | 100.0 | Aluminum Phosphate | 0.5 | 28.6 | 8.0 |
| Example 3 | Kaolin | 0.1 | 100.0 | Aluminum Phosphate | 0.5 | 85.8 | 3.0 |
| Example 4 | Kaolin | 0.3 | 100.0 | Aluminum Phosphate | 0.3 | 171.2 | 1.5 |
| Example 5 | Kaolin | 2.0 | 100.0 | Phosphoric Acid | 0.0 | 13.8 | 13.9 |
| Example 6 | Kaolin | 1.5 | 100.0 | Phosphoric Acid | 0.0 | 38.3 | 5.0 |
| Comparative Example 5 | Kaolin | 0.5 | 100.0 | Aluminum Phosphate | 0.5 | 238.4 | <u>1.4</u> |
| Comparative Example 6 | Kaolin | 0.5 | 100.0 | Aluminum Phosphate | 0.5 | 306.1 | <u>1.2</u> |
| Comparative Example 7 | Kaolin | <u>2.5</u> | 100.0 | Phosphoric Acid | 0.0 | 19.2 | 10.0 |
| Comparative Example 8 | Talc | 0.5 | 100.0 | Aluminum Phosphate | <u>0.6</u> | 25.0 | 6.0 |
| Example 7 | Talc | 0.5 | 100.0 | Aluminum Phosphate | 0.5 | 11.5 | 12.0 |
| Example 8 | Talc | 0.5 | 100.0 | Magnesium Phosphate | 0.5 | 17.9 | 8.0 |

TABLE 1-continued

| | Composition Of Coating Solution | | | | | | |
|---|---|---|---|---|---|---|---|
| | Hydrous Silicate | | | Phosphoric Acid Or Phosphate | | | |
| | Name | Average Particle Size (μm) | Amount Blended (g) | Name | $\Sigma n_i M_i / \Sigma P_i$ | Amount Blended (g) | $(\Sigma n_i M_i + \Sigma n'_j M'_j) / \Sigma P_i$ |
| Example 9 | Talc | 0.1 | 100.0 | Aluminum Phosphate | 0.2 | 19.1 | 5.0 |
| | | | | Magnesium Phosphate | 0.2 | 17.9 | |
| Example 10 | Talc | 1.0 | 100.0 | Calcium Phosphate | 0.4 | 52.5 | 3.0 |
| Example 11 | Talc | 2.0 | 100.0 | Zinc Phosphate | 0.3 | 81.3 | 2.0 |
| Example 12 | Talc | 2.0 | 100.0 | Nickel Phosphate | 0.3 | 113.7 | 1.5 |
| Comparative Example 9 | Talc | 2.5 | 100.0 | Nickel Phosphate | 0.3 | 29.0 | 5.0 |
| Comparative Example 10 | Pyrophyllite | 1.0 | 100.0 | Aluminum Phosphate | 0.4 | 136.5 | 1.4 |
| Example 13 | Pyrophyllite | 1.0 | 100.0 | Aluminum Phosphate | 0.4 | 85.2 | 2.0 |
| Example 14 | Pyrophyllite | 2.0 | 100.0 | Aluminum Phosphate | 0.4 | 14.2 | 10.0 |
| Example 15 | Talc | 1.0 | 50.0 | Aluminum Phosphate | 0.3 | 63.4 | 2.0 |
| | Pyrophyllite | 1.0 | 50.0 | | | | |
| Comparative Example 11 | Pyrophyllite | 0.5 | 100.0 | Aluminum Phosphate | 0.4 | 8.7 | 16.0 |
| Comparative Example 12 | Pyrophyllite | 2.5 | 100.0 | Aluminum Phosphate | 0.4 | 14.2 | 10.0 |
| Comparative Example 13 | Pyrophyllite | 0.5 | 100.0 | Aluminum Phosphate | 0.6 | 178.0 | 1.4 |
| Comparative Example 14 | Pyrophyllite | 0.5 | 100.0 | Aluminum Phosphate | 0.6 | 9.2 | 16.0 |

TABLE 2

| | Film Characteristics | | | | Magnetic Characteristics |
|---|---|---|---|---|---|
| | Space Factor (%) | Corrosion Resistance (%) | Water Resistance (mg/m$^2$) | Film Tension (MPa) | Iron Loss $W_{17/50}$ (W/kg) |
| Reference Example | 98.0 | 0 | 2 | 8 | 0.85 |
| Comparative Example 1 | 95.0 | 15 | 2 | 11 | 0.83 |
| Comparative Example 2 | 95.5 | 14 | 2 | 10 | 0.83 |
| Comparative Example 3 | 95.0 | 15 | 2 | 11 | 0.83 |
| Comparative Example 4 | 95.0 | 16 | 2 | 11 | 0.83 |
| Example 1 | 97.9 | 0 | 2 | 12 | 0.82 |
| Example 2 | 98.0 | 0 | 2 | 11 | 0.83 |
| Example 3 | 98.0 | 0 | 1 | 11 | 0.83 |
| Example 4 | 98.0 | 0 | 2 | 10 | 0.83 |
| Example 5 | 97.9 | 0 | 1 | 12 | 0.82 |
| Example 6 | 98.0 | 0 | 2 | 11 | 0.83 |
| Comparative Example 5 | 98.0 | 0 | 15 | 5 | 0.89 |
| Comparative Example 6 | 98.0 | 0 | 15 | 4 | 0.90 |
| Comparative Example 7 | 95.5 | 17 | 2 | 11 | 0.83 |
| Comparative Example 8 | 95.5 | 14 | 2 | 11 | 0.83 |
| Example 7 | 97.9 | 0 | 1 | 12 | 0.82 |
| Example 8 | 98.0 | 0 | 2 | 11 | 0.83 |
| Example 9 | 98.0 | 0 | 1 | 11 | 0.83 |
| Example 10 | 98.0 | 0 | 2 | 11 | 0.83 |
| Example 11 | 98.0 | 0 | 2 | 11 | 0.83 |
| Example 12 | 98.0 | 0 | 2 | 10 | 0.83 |
| Comparative Example 9 | 95.6 | 18 | 2 | 11 | 0.83 |
| Comparative Example 10 | 98.0 | 0 | 15 | 5 | 0.89 |
| Example 13 | 98.0 | 0 | 2 | 10 | 0.83 |
| Example 14 | 98.0 | 0 | 1 | 11 | 0.83 |
| Example 15 | 98.0 | 0 | 2 | 11 | 0.83 |
| Comparative Example 11 | 95.0 | 16 | 2 | 11 | 0.83 |
| Comparative Example 12 | 95.0 | 20 | 2 | 11 | 0.83 |
| Comparative Example 13 | 95.0 | 18 | 15 | 5 | 0.89 |
| Comparative Example 14 | 94.5 | 20 | 2 | 11 | 0.83 |

The composition of the reference coating solution in Table 1 is as follows.

Aqueous Dispersion of 20 Mass % Colloidal Silica: 100 parts by mass

Aqueous Solution of 50 Mass % Aluminum Phosphate: 60 parts by mass

Chromic Anhydride: 6 parts by mass

In Table 1, the amounts of the clay mineral, the phosphoric acid, and the phosphate added are calculated in terms of anhydride. For example, kaolin is calculated as $Al_2O_3 \cdot 2SiO_2$, and an aluminum monophosphate is calculated as $Al_2O_3 \cdot 3P_2O_5$.

As shown in Table 1, the insulating film of each example is formed using the phosphoric acid and the phosphate satisfying $\Sigma n_i M_i/\Sigma P_i \leq 0.5$, and using the coating solution for forming an insulating film satisfying $1.5 \leq (\Sigma n_i M_i + \Sigma n'_j M'_j)/\Sigma P_i \leq 15$. As shown in Table 2, the insulating film of each example not only has large film tension and a large iron loss reducing effect, but also has an excellent space factor and excellent corrosion resistance and water resistance. It is found that the insulating film of each example can obtain the same or better performance as the film obtained using the coating solution containing the chromium compound shown in the reference example.

In contrast, in Comparative Examples 1, 2, 8, 13, and 14 in which $\Sigma n_i M_i/\Sigma P_i$ exceeds 0.5, the porosity in the film is increased, and the space factor and the corrosion resistance are poor.

In Comparative Examples 3, 4, 11, and 14 in which $(\Sigma n_i M_i + \Sigma n'_j M'_j)/\Sigma P_i$ exceeds 15, the porosity in the film is increased, and the space factor and the corrosion resistance are poor.

In Comparative Examples 5, 6, 10, and 13 in which $(\Sigma n_i M_i + \Sigma n'_j M'_j)/\Sigma P_i$ is less than 1.5, water soluble P in the film after baking increases and satisfactory water resistance is not obtained. Moreover, the film tension is poor. Since the film tension is poor, iron loss is also poor.

In Comparative Examples 7, 9, and 12 in which the average particle size of the hydrous silicate powder exceeds 2 μm, reaction with the phosphoric acid or the phosphate is thought to be incomplete. Accordingly, voids in the film after baking are increased, surface unevenness of the film is increased, and the space factor and the corrosion resistance are poor.

Figure 2:
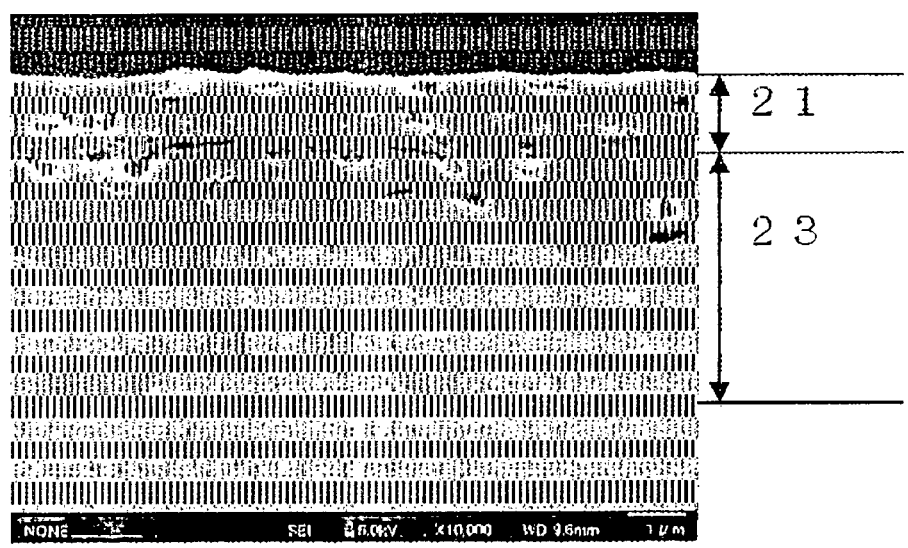
FIG. 2 is a cross-sectional photograph of a grain-oriented electrical steel sheet having an insulating film of Example 1.

Here, FIG. 2 shows the result of SEM observation of the cross section of the grain-oriented electrical steel sheet provided with the insulating film of Example 1. In FIG. 2, the reference numeral 21 represents an insulating film, and the reference numeral 23 represents a final-annealed film (hereinafter, the reference numerals will be omitted). It has been found that the insulating film of Example 1 is a dense film with very few voids as shown in FIG. 2. It is thought that since the insulating film of Example 1 is dense as shown in FIG. 2, the insulating film is excellent in film tension, space factor, corrosion resistance, and water resistance, and iron loss is improved.

Accordingly, the grain-oriented electrical steel sheet obtained using the coating solution for forming an insulating film of this embodiment has a dense insulating film, and is excellent in film characteristics such as film tension, space factor, corrosion resistance, and water resistance with improved iron loss without the use of a chromium compound.

As described above, the insulating film of Comparative Example 1 shown in FIG. 1 has many voids. Accordingly, it is thicker than the insulating film of Example 1 shown in FIG. 2 although the coating amount after film formation is the same (5 g/m$^2$). It is found that the thickness of the insulating film of Example 1 shown in FIG. 2 is about half the thickness of the insulating film of Comparative Example 1 shown in FIG. 1 due to the densification of the film.

Example B

Next, film characteristics and magnetic characteristics are evaluated by changing the baking temperature. A coating solution having the same composition as in Example 1 is applied and dried in the same manner as in Example 1 such that the amount of an insulating film after baking is 5 g/m$^2$. Baking is performed by changing the baking temperature as shown in Table 3 (the baking time is 30 seconds). The results are shown in Table 3.

TABLE 3

| | Baking Temperature (°C.) | Film Characteristics | | | | Magnetic Characteristics |
| --- | --- | --- | --- | --- | --- | --- |
| | | Space Factor (%) | Corrosion Resistance (%) | Water Resistance (mg/m$^2$) | Film Tension (MPa) | Iron Loss $W_{17/50}$ (W/kg) |
| Comparative Example 15 | 500 | 95.0 | 20 | 15 | 5 | 0.89 |
| Example 16 | 600 | 97.9 | 0 | 2 | 10 | 0.83 |
| Example 17 | 700 | 97.9 | 0 | 2 | 11 | 0.83 |
| Example 18 | 950 | 98.0 | 0 | 1 | 13 | 0.82 |
| Example 19 | 1000 | 98.0 | 0 | 1 | 13 | 0.82 |

In Comparative Example 15 in which the baking temperature is lower than 600° C. as shown in Table 3, since the reaction between the hydrous silicate powder and the phosphate is not sufficient, the space factor, the corrosion resistance, and the film tension are poor.

In the examples in which the baking temperature is 600° C. or higher, the film characteristics and the magnetic characteristics are excellent.

Although the preferred examples of the invention have been described as above, the invention is not limited to the examples. It is obvious for those skilled in the art that various alterations or modifications can be made within the scope of the thoughts described in the claims, and these obviously belong to the technical scope of the invention.

INDUSTRIAL APPLICABILITY

Using a coating solution for forming an insulating film for a grain-oriented electrical steel sheet and a method for producing a grain-oriented electrical steel sheet according to the invention, a grain-oriented electrical steel sheet which has large film tension, obtains film characteristics including an excellent space factor and excellent corrosion resistance and water resistance, and has an excellent iron loss property without the use of a chromium compound is obtained, and is thus industrially useful.

The invention claimed is:

1. A coating solution for forming an insulating film for a grain-oriented electrical steel sheet, the solution comprising:
one or more types of hydrous silicate powders having an average particle size of 2 μm or less; and one or more types of phosphoric acids and phosphates satisfying a relation of $\Sigma n_i M_i/\Sigma P_i \leq 0.5$, and satisfying (Formula 1):

$$1.5 \leq (\Sigma n_i M_i + \Sigma n'_j M'_j)/\Sigma P_i \leq 15 \qquad \text{(Formula 1)}$$

(P represents the number of moles of phosphorus, M represents the number of moles of metal ions derived from the phosphate, n represents the valence of the metal ions derived from the phosphate, i represents the number of types of phosphates, M' represents the number of moles of metal elements in the hydrous silicate, n' represents the valence of the metal elements in the hydrous silicate, and j represents the number of types of hydrous silicates).

2. The coating solution for forming an insulating film for a grain-oriented electrical steel sheet according to claim 1, wherein the phosphate is any one of an Al phosphate, a Mg phosphate, a Ca phosphate, a Zn phosphate, and a Ni phosphate.

3. The coating solution for forming an insulating film for a grain-oriented electrical steel sheet according to claim 1, wherein the hydrous silicate powder is one or more of a kaolin powder, a talc powder, and a pyrophyllite powder.

4. A method for producing a grain-oriented electrical steel sheet, the method comprising:
a step of applying a coating solution for forming an insulating film for a grain-oriented electrical steel sheet to a grain-oriented electrical steel sheet after final annealing, and a step of baking the coating solution,
wherein the coating solution contains one or more types of hydrous silicate powders having an average particle size of 2 μm or less and one or more types of phosphoric acids and phosphates satisfying a relation of $\Sigma n_i M_i/\Sigma P_i \leq 0.5$, and satisfies (Formula 1), and a temperature for the baking is 600° C. to 1,000° C., $$1.5 \leq (\Sigma n_i M_i + \Sigma n'_j M'_j)/\Sigma P_i \leq 15 \qquad \text{(Formula 1)}$$

(P represents the number of moles of phosphorus, M represents the number of moles of metal ions derived from the phosphate, n represents the valence of the metal ions derived from the phosphate, i represents the number of types of phosphates, M' represents the number of moles of metal elements in the hydrous silicate, n' represents the valence of the metal elements in the hydrous silicate, and j represents the number of types of hydrous silicates).

5. The method for producing a grain-oriented electrical steel sheet according to claim 4, wherein the phosphate is any one of an Al phosphate, a Mg phosphate, a Ca phosphate, a Zn phosphate, and a Ni phosphate.

6. The method for producing a grain-oriented electrical steel sheet according to claim 4, wherein the hydrous silicate powder is one or more of a kaolin powder, a talc powder, and a pyrophyllite powder.

7. The coating solution for forming an insulating film for a grain-oriented electrical steel sheet according to claim 2, wherein the hydrous silicate powder is one or more of a kaolin powder, a talc powder, and a pyrophyllite powder.

8. The method for producing a grain-oriented electrical steel sheet according to claim 5, wherein the hydrous silicate powder is one or more of a kaolin powder, a talc powder, and a pyrophyllite powder.

* * * * *